US005831609A

United States Patent [19]

London et al.

[11] Patent Number: 5,831,609

[45] Date of Patent: Nov. 3, 1998

[54] METHOD AND SYSTEM FOR DYNAMIC TRANSLATION BETWEEN DIFFERENT GRAPHICAL USER INTERFACE SYSTEMS

[75] Inventors: Mitchell B. London, Redmond; Alan R. Katz, Bellevue; Donald W. Goodrich, Auburn; Steven Zeck, Woodinville, all of Wash.

[73] Assignee: Exodus Technologies, Inc., Bellevue, Wash.

[21] Appl. No.: 472,935

[22] Filed: Jun. 6, 1995

Related U.S. Application Data

[63] Continuation-in-part of Ser. No. 261,492, Jun. 17, 1994, abandoned.

[51] Int. Cl.$^{6}$ .......................... G06F 3/14

[52] U.S. Cl. .......................... 345/335; 345/333

[58] Field of Search .......................... 395/157, 158, 395/156, 159, 160, 335, 374, 338, 339, 340, 682, 326, 327, 341, 337, 351, 352, 353, 359, 330; 463/31

[56] References Cited

U.S. PATENT DOCUMENTS

| | | | |
|---|---|---|---|
| 5,327,529 | 7/1994 | Fults et al. | 395/335 |
| 5,361,344 | 11/1994 | Beardsley et al. | 395/500 |
| 5,375,068 | 12/1994 | Palmer et al. | 364/514 |
| 5,412,772 | 5/1995 | Monson | 395/335 |
| 5,450,600 | 9/1995 | Abe | 395/800 |
| 5,461,716 | 10/1995 | Eagen et al. | 395/157 |
| 5,475,421 | 12/1995 | Palmer et al. | 364/514 |
| 5,498,003 | 3/1996 | Gechter | 273/434 |
| 5,546,324 | 8/1996 | Palmer et al. | 364/514 |
| 5,581,758 | 12/1996 | Burnett et al. | 395/614 |
| 5,627,979 | 5/1997 | Chang et al. | 395/335 |
| 5,634,019 | 5/1997 | Koppolu et al. | 395/335 |

OTHER PUBLICATIONS

Chung et al., "Novell NCTware Multimedia Communication System Using Microsoft Windows," IEEE, 1995.

*Primary Examiner*—Raymond J. Bayerl
*Assistant Examiner*—Steven P. Sax
*Attorney, Agent, or Firm*—Seed and Berry LLP

[57] ABSTRACT

The present invention is directed towards a translation software that provides remote access to an application program that is executing on a host machine in its native operating system environment. The translation software monitors messages that are relayed from the application program to an application interface that is provided via the native operating system. Upon recognizing a message that affects a graphical user interface of the native operating system, the translation software converts the message into a protocol that is recognized by a remote graphical user interface. By monitoring and converting messages in this fashion, the translation software allows the application program to be displayed remotely.

11 Claims, 6 Drawing Sheets

METHOD AND SYSTEM FOR DYNAMIC TRANSLATION BETWEEN DIFFERENT GRAPHICAL USER INTERFACE SYSTEMS

CROSS REFERENCE TO RELATED APPLICATION

This application is a continuation-in-part of U.S. application Ser. No. 08/261,492 filed on Jun. 17, 1994, now abandoned.

TECHNICAL FIELD

The present invention relates to execution-time translation between different graphical user interface systems and in particular, includes a method and system that allows applications written for local-display systems to utilize the remote display capabilities of a different graphical user interface system.

BACKGROUND OF THE INVENTION

Currently, there are approximately 50 million computer users that utilize a graphical user interface known as "WINDOWS" by "MICROSOFT" Corporation. Currently, "MICROSOFT's WINDOWS/NT" is rapidly emerging as a preferred operating system. Consequently, a large number of application programs are written to be compatible with "WINDOWS/NT." "WINDOWS/NT" provides a single graphical user interface in which all these application programs must adhere to. However, a client/server window system known as "X," initially developed at the Massachusetts's Institute of Technology, provides a protocol (X-Protocol) that allows application programs to be displayed remotely on one or more graphical user interfaces (e.g., Motif, Open-Look). Unfortunately, the application programs that are developed for the "WINDOWS/NT" operating system are not compatible with the X-Protocol. Consequently, users of the X-Client/Server window system do not have convenient access to these application programs. This is unfortunate because many of the application programs developed for the "WINDOWS/NT" operating system are superior, in terms of cost and features, to those than developed for the X-Client/Server window system.

SUMMARY OF THE INVENTION

The present invention is directed towards translation software that provides remote access to an application program. More specifically, the translation software provides remote access to an application program that is executing on a host machine in its native operating system environment. The translation software monitors messages that are relayed from the application program to an application interface that is provided via the native operating system. Upon recognizing a message that affects a graphical user interface of the native operating system, the translation software converts the message into a protocol that is recognized by a remote graphical user interface. The translation software also monitors and converts commands at the driver level. By monitoring and converting messages in this fashion, the translation software allows the application program to be displayed remotely.

DETAILED DESCRIPTION OF THE INVENTION

Figure 1:
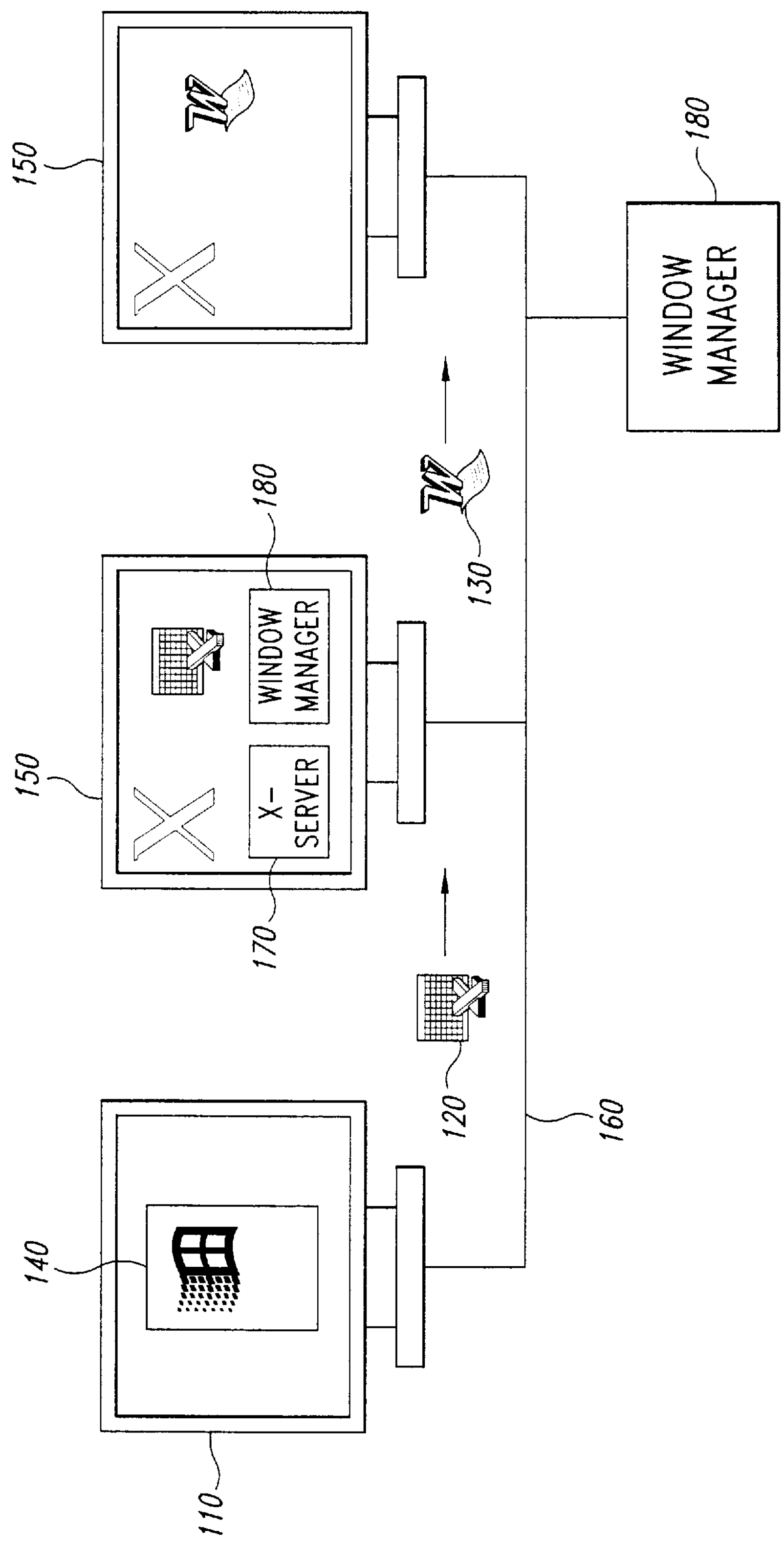
FIG. 1 illustrates a preferred embodiment of the present invention.

The present invention is directed towards a translation software that allows an application program written for a particular graphical user interface system (GUI) to be displayed on another graphical user interface system at execution time. The GUI upon which the application program is displayed is referred to as the target GUI. If the target GUI is capable of remote display over a network, the translation software allows the application program to be displayed and interacted with remotely while it executes within its native (non-remote) GUI.

In its preferred embodiment, the present invention provides for translation from Windows and "WINDOWS/NT" to the X-Window System and thus allows for the remote display of applications developed for "MICROSOFT WINDOWS" and "WINDOWS/NT" on X-Terminals and X-Servers. More specifically, the preferred embodiment allows each such application to appear as a fully compatible X-Client program to remote X-Servers. The term "X-Client" refers to an application program that utilizes the previously described X-Protocol. The term "X-Terminal" refers to any display component (e.g., standalone terminal or workstation) that is a display component of an X-Client/Server windowing system. The term "X-Server" refers to the software that controls the display hardware (e.g., a video display, a keyboard, or mouse) and is responsible for conducting the drawing and rendering of the video display. An attractive feature of an X-Client program is that it may be displayed and/or interacted with (e.g., via mouse, keyboard, etc.) on any X-Terminal provided there is a suitable communications link (typically, but not restricted to, the TCP/IP protocol described below) connecting the machine the X-Client is running on and the X-Terminal.

In the X-Client/Server window system an X-Client communicates with the underlying hardware (e.g., display, mouse, keyboard, etc.) via the X-Server. A separate X-Client, known as a window manager, coordinates with the X-Server to manage the display. More specifically, the window manager keeps track of the state of all X-Windows. The term "X-Window" refers to any portion of an X-Terminal's display that contains its own data (e.g., a document or a message). A primary advantage of the X-Client/Server window system is that it does not constrain an X-Client to the use of any particular window manager. Instead, a user may select the window manager that the user believes offers the most attractive look and feel.

FIG. 1 illustrates a preferred embodiment of the present invention. A host computer 110 executes application programs such as "MICROSOFT EXCEL" 120 and "WORD FOR WINDOWS" 130 under the "WINDOWS/NT" operating system 140. The "WINDOWS/NT" operating system, as well as the application programs 120, 130, are contained within a main memory of the host computer. More specifically, a central processing unit contained within the host computer 110 executes the instructions of both the "WINDOWS/NT" operating system 140 and the application programs 120, 130. The "WINDOWS/NT" operating system provides an application program interface (API) that allows these application programs 120, 130 to communicate with the operating system 140. Additionally, the "WINDOWS/NT" operating system also provides a standard graphical user interface (GUI) that defines the look and feel for all applications running under "WINDOWS/NT." This standard graphical user interface is designed to receive commands from the application program. In brief, the application programs 120, 130 utilize the application interface to request the operating system to conduct a variety of tasks. For example, representative tasks include the opening and closing of files, as well as making various adjustments to the graphical user interface. However, the "WINDOWS/NT" operating system does not provide for remote interaction with applications. In its preferred embodiment, the present invention overcomes this limitation of "WINDOWS/NT" by allowing application programs 120, 130 to be executed on the host computer while being displayed remotely on an X-Terminal 150. In this manner, the present invention allows users of the X-Client/Server window system to gain access to applications developed for the "WINDOWS/NT" operating system. Moreover, as the preferred embodiment of the present invention allows the application programs 120, 130 to be executed in their native operating system environments (e.g., the "WINDOWS/NT" operating system 140), the present invention provides such access in a highly efficient manner.

As illustrated, the host computer 110 is connected to the X-Terminals 150 via a network connection such as the TCP/IP protocol used on the Ethernet. In brief, this protocol consists of a series of layers. More specifically, the five lower-most layers in ascending order are; the wire, the Ethernet, the Internet protocol (IP layer), the transport control protocol (TCP layer) and the X-Protocol. This network connection is conceptually illustrated by reference 160.

As described above, the X-Client/Server window system utilizes two components: an X-Server 170 and a window manager 180. The window manager 180 manages X-Windows by keeping track of how many X-Windows are currently displayed, where the X-Windows are currently displayed, etc. As the present invention converts the "WINDOWS/NT" application to a fully compatible X-Client, a user may select a particular window manager 180 (e.g., Motif, Open-Look, Tom's Window Manager) for use with the present invention. In brief, the window manager 180 receives commands that relate to the display of the X-Terminals 150. As the window manager 180 may be contained within the X-Terminal itself or on the network, the window manager may receive commands over the network connection 160 or directly from the X-Terminals 150.

Figure 2:
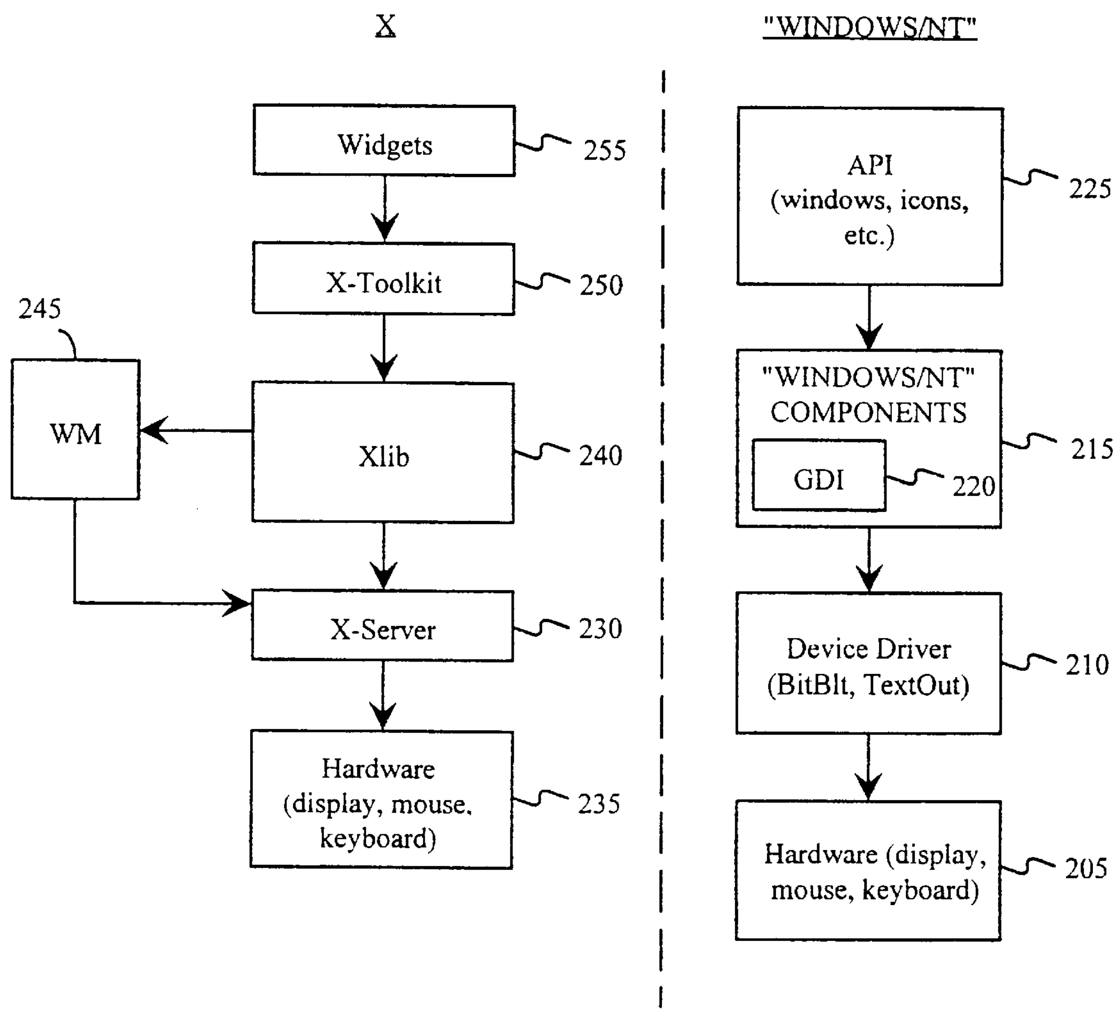
FIG. 2 compares system design structures for a client/server window system and an operating system.

FIG. 2 compares system design structures for a client/server window system and an operating system. More specifically, FIG. 2 compares the system design structure of the X-Client/Server windowing system and the "WINDOWS/NT" operating system. A knowledge of these structures is helpful when discussing the processing steps described in FIGS. 3–6.

In "WINDOWS/NT" programs (e.g., application programs) are provided with a standard interface to the hardware 205 (e.g., display, keyboard, mouse, etc.) via device drivers 210. The various components 215 of the "WINDOWS/NT" operating system are layered above the device driver. One such component is Graphics Device Interface 220 (GDI). The GDI allows applications programs to describe graphical information without reference to the underlying hardware. The Application Program Interface 225 (API) exists above the "WINDOWS/NT" components layer. The API contains the notion of windows, icons, cursors, and other resources. "WINDOWS/NT" is an event driven, message based system. Various programs communicate with each other and with "WINDOWS/NT" by passing messages via the API. In regards to graphically displayed information, the API utilizes high-level constructs such as windows or icons. In contrast, the video device driver utilizes lower-level representations of graphical data (e.g., bitmap data). One of the purposes of the video device driver is to relay this bitmap data to the display device. For example, when the user moves or resizes a window, a large number of BitBlts (block transfers of bitmap data) are executed by the display driver.

The X-Server-Client windowing system is structured somewhat similarly to the "WINDOWS/NT" operating system. An X-Server 230 provides a standard interface to the underlying hardware 235. A library, Xlib 240, provides a (lower level) programmers' interface for X. When the X-Client is run locally, the X-Client issues commands from the Xlib library 240 to access the local hardware 235 through the X-Server 230. Similarly, when the X-Client is run remotely, the X-Client issues commands from the Xlib library 240 to access the remote hardware. In this case, network packets which represent elements of the X-Protocol are sent to the X-Server 230 that serves the remote hardware 235. Like "WINDOWS/NT," X is an event driven system and an X-Client may request the X-Server 230 to send it X-Events of interest (such as the mouse entering or leaving a window, the user clicking in a window, etc.). As mentioned above, a special X-Client program, the window manager 245, allows the user to manage displayed windows, define menus, etc. Above the relatively low-level Xlib interface, a X-Toolkits 250 provides a higher level programmers interface. There are many such toolkits which are available commercially (e.g., the "XT," "ANDREW," and "MOTIF" toolkits). Each toolkit comes with a collection of Widgets 255, which are useful collection of X objects (for example, a scrollable text window Widget). Having provided a comparison of the structures of the X-Client/Windowing system and the "WINDOWS/NT" operating system, the processing steps of a preferred embodiment of the present invention will now be described.

Figure 3:
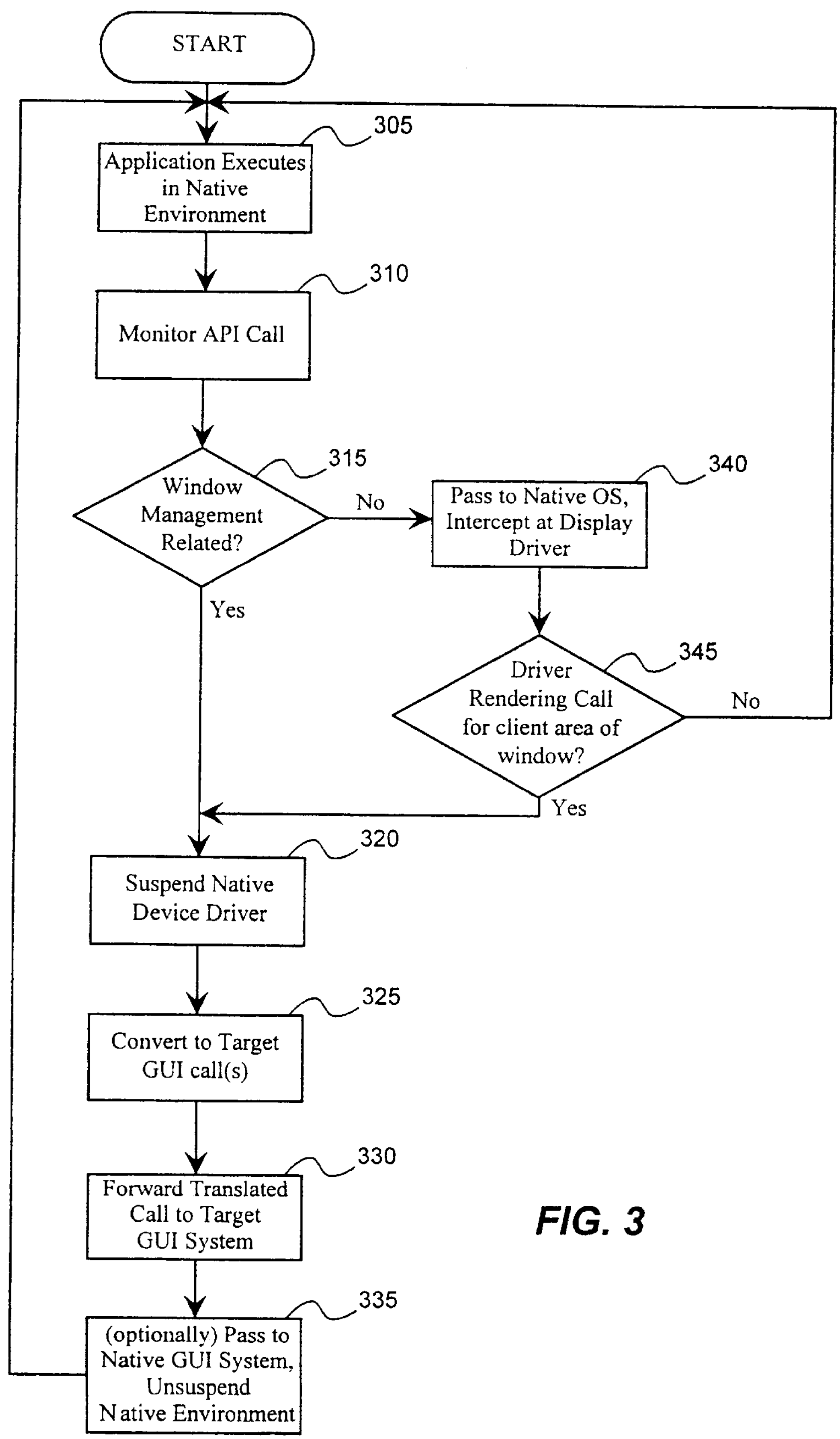
FIG. 3 is a flow diagram of the processing steps of the preferred embodiment of the present invention.

FIG. 3 illustrates the processing steps of a preferred embodiment of the present invention. More specifically, FIG. 3 illustrates an overview of the processing steps taken by the translation software to translate a natively executing application program into a fully compatible client of a non-native windowing system. Initially, an application program is executed in its native environment (step 305). For example, in one preferred embodiment, this native environment is the "WINDOWS/NT" operating system. Once the application program is executing in its native environment, the translation software monitors system calls that the application relays to the native environment via the native environment's application program interface (step 310). For example, in a preferred embodiment, the translation software monitors the commands that are relayed from the application program to the application program interface provided by "WINDOWS/NT").

For each monitored system call, the translation software evaluates whether the command represented by the API call is window management related (step 315). A command is "window management related" when the results of the command alter the positioning of the application program's window (e.g., moving, resizing, stacking the application program's window). Thus, step 315 operates as a high-level intercept between the application program and the native operating system.

When the API command is window management related, the translation software preferably suspends the native device driver's (e.g., the mouse driver, the keyboard driver, the display driver) ability to process the command (step 315, YES PATHWAY and step 320). In some instances, suspending the native device driver's ability to process the command is advantageous as it greatly increases the system's response time. For example, by suspending the native display driver while a window is being moved, the native display driver does not continuously redraw the window's image as the user drags the window across the display. As a result, the display driver does not continuously send the BitBlts (blocks of bitmap data) that represent the window's image to the display hardware. Consequently, and especially in systems where a local display of the natively-executing application is not desired, system performance is greatly improved due to the reduction in unnecessary data transfer. After suspending the native device driver, the translation software converts the command into a format that is recognizable by the target GUI (step 325). In a preferred embodiment, this target GUI adheres to a protocol known as the X-Protocol. Consequently, the translation software converts the API command to a command of the X-Protocol (e.g., a command from the Xlib library). Once the command has been converted, the translation software forwards the command to the target GUI system (step 330). For example, in a preferred embodiment this command is forwarded to a window manager. The window manager then effectuates the converted command via the X-Server. As an optional step, the translation software can also pass the command to the native GUI system so that window management may be effectuated on a local native display (step 335). Whether or not the above optional step is performed, the translation software releases the native device driver from its suspended state (step 335).

Referring back to step 315, when the monitored command is not window management related, the translation software passes the command to the application program's native operating system (step 315, NO PATHWAY, and step 340). Subsequently, the translation software intercepts each system call at the device driver level and determines when the system call will affect the internal state of the application program's window (steps 340 and 345). Thus, steps 340 and 345 operate as a low-level intercept between the application program and the native operating system. For the case where the system call will not affect the internal state of the application program's window, the translation software allows the application program to execute in its normal fashion (step 345, NO PATHWAY, and step 305). On the other hand, when the system call will affect the internal state of the application program's window, the translation software converts the system call to a target GUI call after suspending the native device driver (step 345, YES PATHWAY, steps 320 and 325). After translating the system call, the translation software forwards the translated call to the target GUI system (step 330). The translation software then optionally passes the command to the native GUI display driver (step 335). Again, this optional step is only performed if local display of the natively-executing application program is desired. By repeating processing steps 305–345, the present invention allows the application program to be executed in its native environment while simultaneously allowing the application to be interacted with remotely on a remote terminal or work station. Having described the processing steps of a preferred embodiment of the present invention, the preferred embodiment will now be explained by way of example.

Figure 4:
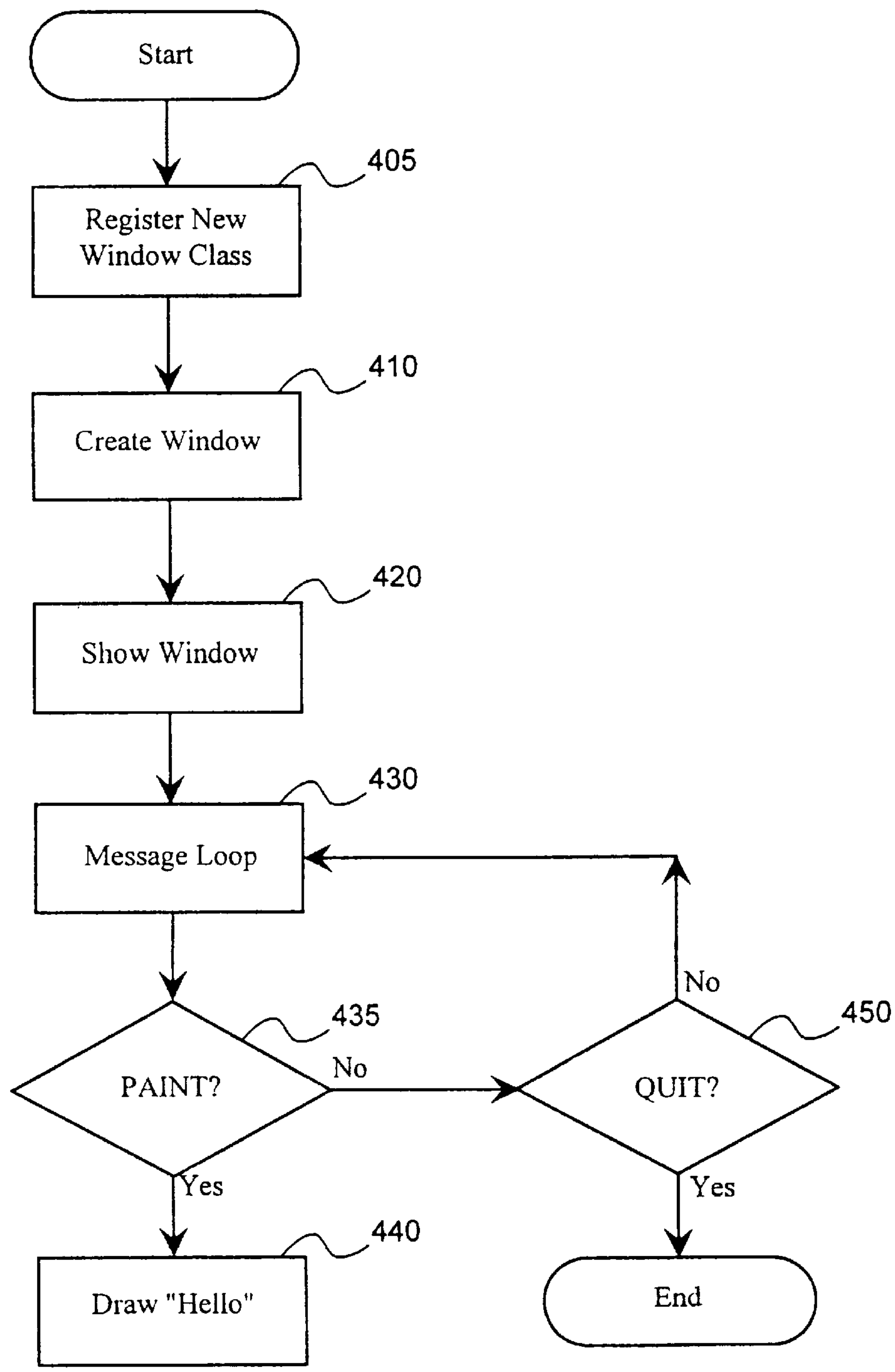
FIG. 4 illustrates a flow diagram of the processing steps of an application program (prior art).

FIG. 4 illustrates the processing steps of an application program. This program is designed to, in conjunction with an operating system, create a window which displays the text "Hello." The program's processing begins by registering a window class with its intended native operating system (step 405). This window class describes a series of global attributes (e.g., an icon for the window that appears when the window is minimized, the background color for the window, etc.) for a class of windows. Once a class of windows has been registered with the operating system, the program creates a window for the class using a CreateWindow API call (step 410). The CreateWindow API call creates the desired window internally in the memory of the computer system. To display the window on the video display, the program issues a ShowWindow API call (step 420). A processing loop, collectively represented by blocks 430, 435, 440 and 450, then requests the painting of the text "Hello" on the video display. The message loop 430 refers to the code that retrieves messages from a message queue provided by the native operating system. More specifically, when the program receives a paint message (step 435, YES PATHWAY), the program requests the rendering of the character string "Hello" in the center of the displayed window (step 440). On the other hand, when the received message is not a paint message (step 435, NO PATHWAY), the program determines whether or not the received message is a quit message (step 450). When the received message is not a quit message (step 450, NO PATHWAY), the program loops back to step 430 and waits for the next message. When the program receives a quit message (step 450, YES PATHWAY), the program exits.

Figure 5:
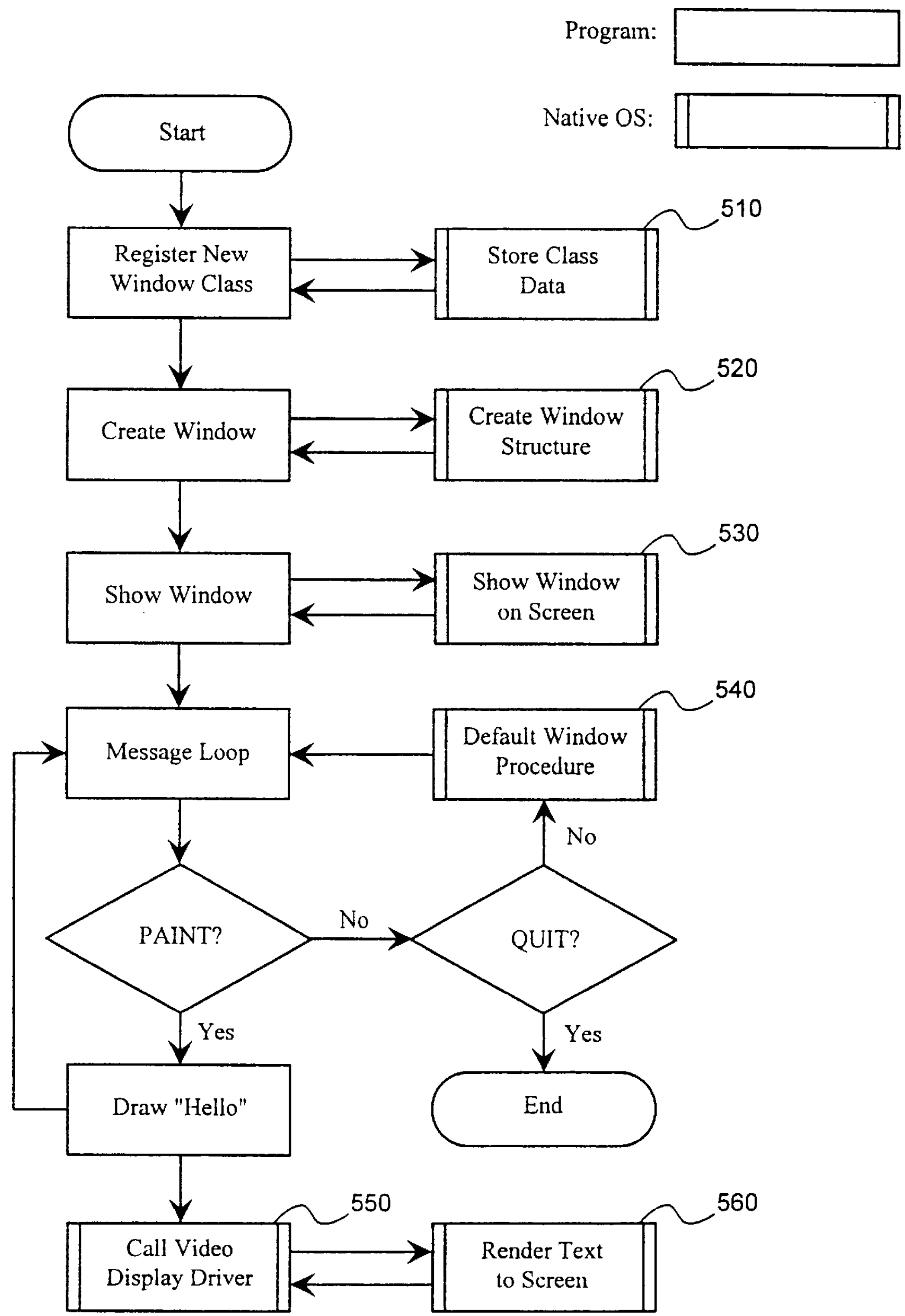
FIG. 5 illustrates a flow diagram of the processing steps for the interaction between the application program and a native operating system (prior art).

FIG. 5 illustrates a flow diagram of the processing steps for the interaction between the application program of FIG. 4 and a native operating system. The native operating system responds to the registering of the new window class by storing class data for the new data class (step 510). By storing this data, a window, or a number of windows, can be created based on the stored class data. Next, the native operating system responds to the CreateWindow API call by creating a window structure (step 520). More specifically, the native operating system creates a window structure based on the passed parameters of the CreateWindow API call (e.g., the window style, the window caption, initial positioning, etc.) and returns to the application program a handle to the created window structure. After the window structure is created, the native operating system displays the window on the computer system's video display in response to the ShowWindow API call (step 530). In brief, the native operating system accomplishes this by receiving, as an input parameter from the application program, the handle that identifies the window that the application program desires to display. The native operating system also receives an input command which indicates whether the window should be displayed in normal or minimized format. After the native operating system displays the window, the application program begins inputting messages from the message queue via the previously described processing loop (steps 410–450 of FIG. 4). The native operating system provides a Default Window Procedure (step 540 of FIG. 5) that handles all the messages that the application program itself does not process (i.e., all messages other than paint and quit messages). As previously described, when the application program receives a paint message, the application program issues a draw "Hello" command to the native operating system. The native operating system responds to this command by calling the video display driver (step 550). In turn, the video display driver renders the text to the video display (step 560). In the above-described manner, the native operating system interacts with the application program to display a local window.

Figure 6:
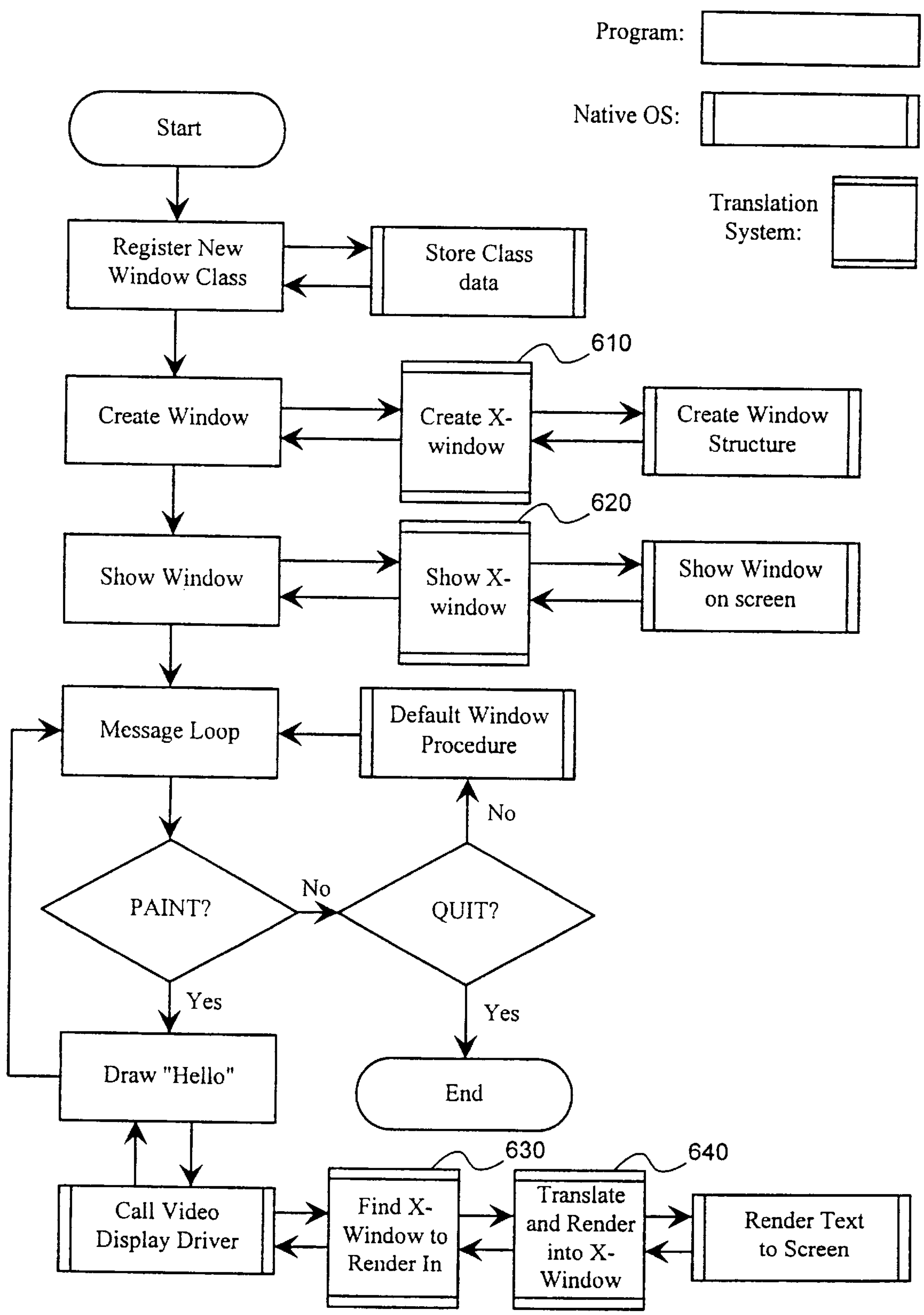
FIG. 6 illustrates a flow diagram of the processing steps for an example according to a preferred embodiment of the present invention.

FIG. 6 illustrates a flow diagram of the processing steps for an example according to a preferred embodiment of the present invention. This example illustrates how a preferred embodiment provides for remote interaction, in a non-native environment, with a natively executing application. As can be observed from the flow diagram, the preferred embodiment allows system calls that are not window management related (e.g., registering the window class) to be passed directly to the native operating system. However, when an API call is window management related (e.g., creating windows, showing windows), the translation software intercepts the API call before passing the call to the native operating system (steps 610 and 620). For example, in the case of the API call CreateWindow, the preferred embodiment first calls either XGetGeometry or XGetWindow attributes to determine the dimensions of the remote server display. Once the dimensions of the remote server display are known, the translation software calls the Xlib function XCreateWindow to create a remotely displayed window in an X-Environment. Similarly, when the application program issues a ShowWindow API call, the translation software displays a respective X-Window (step 620) prior to passing the ShowWindow API call to the native operating system. Thus, in the example of FIG. 6, steps 610 and 620 represent the high-level intercept discussed with relation to step 315 of FIG. 3. Analogously, steps 630 and 640 of FIG. 6 represent the low-level intercepts discussed with reference to step 345 of FIG. 3. More specifically, the translation software intercepts the application program's call to the video display driver (step 630). As mentioned above, the video display driver does not deal with high-level constructs such as windows. As a result, the translation software must first determine the respective X-Window for which the call to the video display driver was made. This determination can be accomplished in a number of ways. For example, this determination can be made by maintaining and evaluating data structure that contains internal window state information for all the X-Windows that are currently in existence. In this scenario, the translation software determines the screen coordinates that are referenced by the display driver call. The translation software can then cross-reference these coordinates to obtain a handle for the window structure that owns the coordinates. In turn, this handle can then be cross-referenced to determine the respective X-Window. Having determined the desired X-Window, the translation software translates the rendering request into X-Calls and sends these calls to the remote X-Server. In this manner, the remote display is quickly and efficiently updated. Finally, the translation software optionally passes the video display driver call to the local video driver if desired. This step is only necessary if local rendering is desired.

As explained in this preferred embodiment, the present invention allows application programs that are executed under the "WINDOWS/NT" operating system to be interacted with remotely via the X-Client/Server window system. One particularly advantageous use of the preferred embodiment relates to the field of medical technology. More specifically, a preferred embodiment of the present invention is in the Multi-Disclosure Review Station manufactured by SpaceLabs, Incorporated utilizes a medical monitor as an X-Server. This specialized X-Server then renders the patient's critical data (e.g., a heart wave-form) on an accompanying X-Terminal. With the advent of the present invention, not only can the physician view a patient's heart wave-form on this terminal, but the physician can also access application programs written for the "WINDOWS/NT" operating system. As a result, the physician's work is greatly simplified. For example, an application such as "MICROSOFT EXCEL" can be used to maintain a database of the patient's medical history. Thus, the present invention allows the physician to retrieve the patient's up-to-date medical history while simultaneously viewing the patient's heart wave-form. As the present invention provides simultaneous access to current and past medical conditions, the physician can quickly and easily obtain all the information that is necessary to treat the patient via a single terminal. In this manner, the physician can work more efficiently.

The detailed discussion provided above illustrates preferred embodiments of the present invention. This discussion will enable those skilled in the art to make various modifications to this embodiment that do not depart from the spirit and the scope of the invention. For example, while a preferred embodiment was described with reference to the "WINDOWS/NT" operating system, those skilled in the art will realize that the inventive concepts disclosed within are not limited to any particular operating system. Similarly, while the preferred embodiment was described with reference to the X-Protocol, those skilled in the art will appreciate that the inventive concepts disclosed herein are not limited to the protocol of any particular remote graphical user interface. Accordingly, the present invention contemplates all such modifications that read upon the appended claims and equivalents thereof.

We claim:

1. A method for running an application as an X-Client so as to enable the application to be displayed with an X-Windows manager, the method comprising the steps of:

launching a "WINDOWS/NT" session;

invoking an application from within the "WINDOWS/NT" session;

monitoring output messages that are sent from the application;

determining that one of the monitored output messages is a graphical user interface command; and when the monitored output message is a graphical user interface command, enabling an X-Windows manager program to act on the command, and informing the "WINDOWS/NT" device driver of results of the command that was acted on by the X-Windows manager program, wherein the enabling step includes converting the graphical user interface command from a "WINDOWS/NT" format into a format that is recognized by X-Windows manager program to enable the X-Windows manager program to act on the command.

2. A method for providing remote display and interaction with an application program that is executing on a local machine, the local machine executing the application program using a native operating system, wherein the native operating system includes a local application interface structured to respond to graphical user interface commands from the application program, and a local graphical user interface, the method comprising the steps of:

detecting a graphical user interface command that is output from the application program to the application interface;

converting the detected graphical user interface command from a first format to a second format, the first format being recognizable by the local graphical user interface and not recognizable by a remote graphical user interface and the second format being recognizable by the remote graphical user interface and not recognizable by the local graphical user interface, wherein the local graphical user interface is a graphical user interface of WINDOWS or WINDOWS/NT; and sending the converted command to the remote graphical user interface so that the detected message can be interpreted by the remote graphical user interface wherein the remote graphical user interface, is an X-Windows graphical user interface.

3. The method of claim 2 wherein the remote graphical user interface is a graphical user interface known as X.

4. A method for providing remote user interaction with an application program that is being run in its native environment on a host machine, the native environment providing a local graphical user interface for allowing local user interaction with the application program, the method comprising the steps of:

determining when the application program has sent a command to the local graphical user interface;

suspending the native environment's ability to process the determined command;

converting the determined command to a protocol that is recognizable by a remote graphical user interface; and sending the converted command to the remote graphical user interface to enable the remote graphical user interface to act on the converted command, wherein the local graphical user interface is a graphical user interface of WINDOWS or WINDOWS/NT and the remote graphical user interface is an X-Windows graphical user interface.

5. The method of claim 4 wherein the remote graphical user interface is a graphical user interface known as X.

6. A computer system that executes an application program using an operating system that includes a first graphical user interface that has an ability to process graphical user interface commands, the computer system comprising:

a monitoring device that determines that the application program has sent a command to the first graphical user interface, the command being in a first format that is recognizable by the first graphical user interface;

a disabling device that suspends the local first graphical user interface's ability to process the determined command; and a modifier that converts the determined command from the first format to a second format that is recognizable by a second graphical user interface and sends the converted command to the second graphical user interface to enable the second graphical user interface to act on the converted command, wherein the first graphical user interface is a graphical user interface of WINDOWS or WINDOWS/NT and the second graphical user interface is an X-Windows graphical user interface.

7. A method for allowing a Windows or "WINDOWS/NT" application to run in its native environment in addition to running as an X-Client using an X window manager so as to enable the application to be displayed on a remote X-Terminal, the method comprising the steps of:

remotely launching the Windows or "WINDOWS/NT" application;

monitoring system calls and display-driver calls that are made by the Windows or "WINDOWS/NT" application;

determining whether one of the monitored system calls is a graphical user interface related command;

determining whether one of the monitored system calls would affect an internal state of a window owned by the Windows or "WINDOWS/NT" application; and whenever one of the monitored system calls is a graphical user interface command and whenever one of the monitored system calls would affect the internal state of the window owned by the Windows or "WINDOWS/NT" application program, converting the system call into one or more graphical user interface command recognizable by the X window manager, causing the X window manager to execute the one or more graphical user interface commands on the remote X-Terminal and then allowing an operating system of the native environment to process the call.

8. A method for execution-time translation from a first graphical operating system to a second graphical operating system wherein the first graphical operating system does not provide for remotely displaying application programs, and wherein the second graphical operating system does provide for remotely displaying application programs, the method comprising the steps of:

monitoring system calls that are made by an application program that is executing in the first graphical operating system;

determining whether one of the monitored system calls is a graphical user interface related command;

determining whether one of the monitored system calls would affect an internal state of a window that is owned by the application program that is executing in the first graphical operating system; and whenever one of the monitored system calls is a graphical user interface command and whenever one of the monitored system calls would affect the internal state of the window that is owned by the application program that is executing in the first graphical operating system, converting the system call into one or more graphical user interface command recognizable by the second graphical operating system, causing the second graphical operating system to execute the one or more graphical user interface commands converted from the system call to affect a remote display screen controlled by the second graphical operating system and then allowing the first graphical operating system to process the system call, wherein the first graphical operating system is WINDOWS or WINDOWS/NT and the second graphical operating system includes X-Windows.

9. A method for translating, from a first graphical operating system to a second graphical operating system, commands of an application program that is executing in the first graphical environment wherein the first graphical operating system does not provide for a remote display of the application program, and wherein the second graphical operating system does provide for the remote display of the application program, the method comprising the steps of:

monitoring device driver calls that are made by the application program;

determining when one of the monitored device driver calls is targeted for a window that is owned by the application program; and whenever one of the monitored device driver calls is targeted for the window that is owned by the application program, issuing appropriate commands in the second graphical operating system in order to accomplish an effect on a remote display that is controlled by the second graphical operating system, wherein the first graphical operating system is WINDOWS or WINDOWS/NT and the second graphical operating system includes X-Windows.

10. The method of claim 9, further comprising the step of:

allowing the first graphical operating system to process the monitored device driver call only after issuing the appropriate commands in the second graphical operating system.

11. The method of claim 9, further comprising the steps of:

monitoring application program interface calls that are made by the application program;

determining when one of the monitored application program interface calls is a graphical user interface command; and whenever one of the monitored application program interface calls is a graphical user interface command, issuing appropriate commands in the second graphical operating system in order to accomplish an effect on the remote display that is controlled by the second graphical operating system.

* * * * *